March 2, 1971            M. PACAK            3,566,503

METHOD AND APPARATUS FOR MAKING GROOVED WHEELS

Filed May 2, 1966

INVENTOR
MATTHEW PACAK

BY Hoffmann and Yount

ATTORNEYS

United States Patent Office
3,566,503
Patented Mar. 2, 1971

3,566,503
METHOD AND APPARATUS FOR MAKING
GROOVED WHEELS
Matthew Pacak, Solon, Ohio, assignor to Eaton
Yale & Towne Inc., Cleveland, Ohio
Continuation-in-part of application Ser. No. 538,853,
Mar. 30, 1966. This application May 2, 1966,
Ser. No. 546,707
Int. Cl. B21d 53/26; B21k 1/28, 1/42
U.S. Cl. 29—159
9 Claims

ABSTRACT OF THE DISCLOSURE

A method and apparatus for fabricating a grooved member from a disc-shaped metal blank. The method includes rotating the blank, splitting and separating the edge portion of the blank by means of a splitting tool so as to form a pair of flanges separated by a groove, and shaping the groove by means of a groove-forming tool whereby the force applied to the blank by operation of the splitting tool serves to counteract the force applied by operation of the forming tool. The apparatus includes a spindle means for rotating the blank, a splitting tool which operates to split the edge portion of the blank into a pair of flanges and to spread the flanges in order to define a groove, a groove-forming tool which operates to shape the groove, and means whereby the force applied to the blank and spindle means by the forming tool is counteracted by the force applied to the blank by the splitting tool.

---

Figure 1:
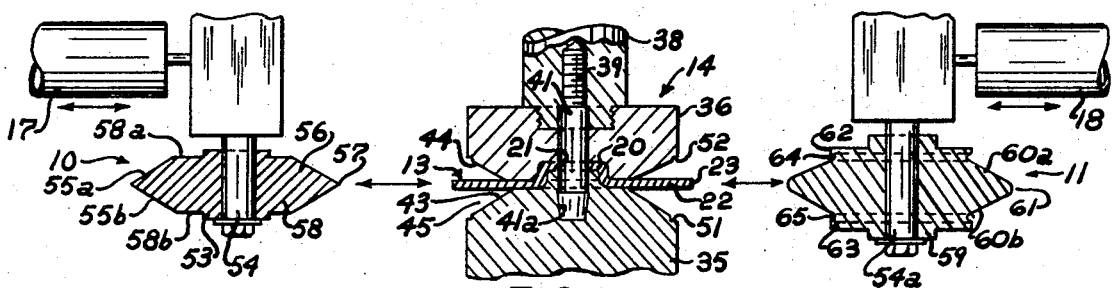

This application is a continuation-in-part of my copending application Ser. No. 538,853, filed Mar. 30, 1966, and which is a continuation of my application Ser. No. 266,451, filed Mar. 19, 1963, which in turn is a continuation-in-part of my original application Ser. No. 854,957, filed Nov. 23, 1959, and now Pat. No. 3,087,531, issued Apr. 30, 1963.

The present invention relates to the manufacture of peripherally grooved members, such as peripherally grooved wheels, pulleys, sheaves, and other wheel-like members, and provides a novel method and apparatus for producing such grooved members by a blank splitting procedure.

It is common practice in the making of a peripherally grooved member, such as a pulley, to provide a blank and to mount the blank in a rotating spindle to effect rotation of the blank upon rotation of the spindle. A cutting or splitting tool is then moved into engagement with the peripheral edge of the rotating blank and moved radially inwardly to split the blank to form separated flanges which define a peripheral groove. The flanges are then shaped to the desired configuration by forming tools. In this connection, reference may be made to U.S. patent to Bidle, No. 1,494,409, which generally shows the type of operation referred to. The present invention is directed to a novel and improved method and apparatus of the above-noted general type for manufacturing pulleys, and the like.

The principal object of the present invention is provision of a new and improved method and apparatus in which grooved members can be produced rapidly and economically by splitting and forming tools acting on a rotating blank and wherein the tools engage the blank simultaneously and at diametrically opposite locations to counterbalance the forces applied to the blank.

A further object of the present invention is the provision of a new and improved method and apparatus for forming grooved members wherein a splitting tool engages a blank from one side and a forming tool located on the other side of the blank moves inwardly and engages the blank and where the tools simultaneously engage the blank at diametrically opposite locations so that forces applied are counterbalanced and no excess load or lateral forces are applied to the spindle and/or blank.

A still further object of the present invention is the provision of a new and improved method and apparatus for producing grooved members wherein a blank is mounted in a spindle and rotated therewith and a splitting tool engages the blank to effect a splitting of the blank to form flanges defining a groove and a forming tool moves into the groove formed by the splitting tool and applies a pressure to the bottom of the groove in order to round off and form the bottom of the groove while the splitting tool is in engagement with the blank.

Another object of the present invention is the provision of a new and improved method and apparatus for forming grooved members by splitting the peripheral edge of a blank with a splitting tool to form flanges defining a groove therebetween, and wherein the splitting tool has a tapered cutting portion which spreads the flanges apart as the tool moves radially inwardly of the blank and forms straight flanges throughout the length thereof.

Further objects and advantages of the present invention will be apparent to those skilled in the art to which it relates from the following detailed description of the preferred embodiment thereof made with reference to the accompanying drawings forming a part of this specification and in which:

FIG. 1 is a schematic view illustrating a part of an apparatus for making grooved members, such as pulleys; and FIGS. 2 through 6 are schematic sectional views illustrating parts of the apparatus in FIG. 1 in different operative positions illustrating the various steps in the formation of a pulley by the apparatus of FIG. 1.

The method and apparatus of this invention are intended for the rapid and economical production of grooved members or wheels of good quality and uniformity, such as pulleys, sheaves and the like, by splitting and shaping of a sheet metal blank. The invention involves the use of splitting and forming tool means and the engagement thereof in a particular manner with the edge portion of the metal blank so as to split and form such edge portion into a grooved rim. The tool means is here shown as comprising rollers 10 and 11, which are brought into operative engagement with the edge portion or periphery of a circular or disc-shaped metal blank 13 for splitting such edge portion and shaping the same into a grooved rim, while the blank is being held and rotated by a workholder means 14.

The splitting and forming rollers 10 and 11 and the workholder means 14 ordinarily comprise components of a wheel making apparatus, such as the machine shown and described in detail in U.S. Pat. No. 3,087,531. In that machine the workholder means 14 is located between a pair of tool carrying heads which support the splitting and forming rollers 10, 11. The rollers 10, 11 are located at diametrically opposite locations on opposite sides of the rotational axis of the workholder means 14 and are movable into engagement with the edge portion of the blank 13 from opposite sides. Suitable hydraulic cylinders 17, 18 are associated with rollers 10, 11, respectively, as shown schematically in FIG. 1, and effect movement of the rollers 10, 11 to perform the splitting and forming operations.

The blank 13 is shown, by way of example, as being a disc-like metal stamping having a cup-shaped central hub 20 provided with an opening 21 and a flat circular plate portion 22 of substantially uniform thickness connected with the hub in a radially projecting relation thereto and terminating in a flat annular peripheral edge. The peripheral edge presents a radially outwardly facing circular edge wall 23 of an axial dimension corresponding with the thickness of this portion of the blank.

The blank 13 can be of any sheet stock suitable for the splitting procedure disclosed herein and is of a thickness having a suitable relation to the diameter of the blank. The sheet stock is preferably one which will have a desired uniformity as to the hardness and grain structure of the edge portion, so as to facilitate the splitting procedure and the accuracy thereof. If the blank 13, or the sheet stock from which it is obtained, does not initially have the hardness and grain structure characteristics needed for a good splitting action, it can be suitably treated as by annealing, heat-treating or other such steps to acquire the needed characteristics. Although the blank 13 is shown as being a one-piece stamping, it may, if desired, be a well-known form of wheel structure comprising a hub member and a disc member suitably connected to such hub member.

The workholder means 14 is shown in FIG. 1 as comprising cooperating workholder members 35, 36 which are rotatable about a common axis. The lower workholder member 35, as shown in FIG. 1, is an anvil member and the upper workholder member 36 is a clamping member for clamping the blank 13 against the anvil member 35. The clamping member 36 is movable toward and away from the anvil member 35 for clamping or releasing the blank 13, as by means of a reciprocably movable actuating rod 38 to which the clamping member 36 is attached by a threaded connection 39. The workholder means 14 also includes a pilot pin 41 extending through and projecting from, the clamping member 36 and which is movable into a socket 41a of the anvil member 35 by passage through the opening 21 of the blank.

The workholder members 35, 36 are provided with annular bevel surfaces 43, 44 on their adjacent ends which cooperate to define an inwardly converging annular work groove 45. The anvil member 35 is here shown as having a central axial stem portion or boss which enters the recess of the cup-shaped hub portion 20 of the blank 13 and the clamping member 36 is provided with a cup-shaped mating central axial recess for receiving the hub of the blank, so that the cooperation of these portions of the workholder members with the blank will result in the blank being securely held therebetween with the flat annular edge portion 22 projecting radially into or through the work groove 45.

When the blank 13 has been clamped in the workholder means 14 in the relation just described above, the mid-plane of the flat plate portion 22 of the blank will be substantially coincident with the transverse mid-plane of the annular work groove 45 which is also the parting plane between the workholder members 35, 36. The workholder members 35, 36 are also provided at the outer edges of the bevel surfaces 43, 44 with annular recesses or notches 51, 52, respectively.

The splitting roller 10 is of an appropriate size in relation to the dimensions of the blank 13 on which it is to operate and is shown as having a hub portion 33 by which this tool can be rotatably mounted on a suitable shaft or arbor 54. The splitting roller 10 is also shown as having outwardly convergent annular portions comprising a ridge-shaped portion 56 which terminates in and supports an annular apex or knife-edge 57.

The portion of the roller 10 which connects the annular ridge portion 56 with the hub 53 is here shown as being an annular radial portion 58 having parallel annular sides 58a and 58b. The included angle between the convergent side faces 55a, 55b of the ridge portion 56 is of a suitable value corresponding substantially with the included angle of the V-shaped groove to be produced in the blank. The included angle is preferably 37 degrees, but the included angle could be of any desired value between, say, 30 degrees and 90 degrees. The splitting roller 10 is made of suitable material such as hardened tool steel.

It has already been indicated above in a general way that the included angle of the convergent annular edge portion 56 which is adjacent the knife-edge 57 of the splitting roller 10 is an important characteristic because, if this edge portion is relatively thin, that is, defined by a very small included angle, it will be subject to rapid dulling, and consequently, the tool will have a short life and will need frequent replacement which will mean frequent interruptions in the production operation of the machine. On the other hand, if the convergent annular edge portion 56 is less sharp by reason of its being thicker, that is, having an included angle of a relatively large value, the tool will have a greater useful life but will penetrate the blank more slowly and will also be subject to a greater tendency for run-off of the tool from the edge portion of the blank.

The roller 10 preferably has a sharp annular splitting edge which is defined by an included angle not materially greater than, say, 75 degrees. A splitting edge having an included angle of a value from 30 degrees to 75 degrees, will provide a relatively rapid penetration rate with a good tool life and will also operate satisfactorily in contacting or marking the edge of the blank during feeding engagement therewith with very little tendency to tear or deflect the blank or to have any marked run-off tendency. The sharp annular edge portion 56 of the splitting roller 10 is symmetrical in cross-sectional shape, as shown in FIG. 1, with the knife edge 57 lying in the radial mid-plane of the roller.

The forming roller 11 is shown as having a hub portion 59, by which this roller can be rotatably mounted on a suitable shaft or arbor 54a, and carries an outwardly convergent annular ridge portion 60 terminating in a blunt or transversely convex peripheral edge 61. The annular ridge portion 60 is substantially V-shaped and constructed so that the included angle between the side faces 60a, 60b thereof will correspond substantially with the included angle of the annular grove desired in the completed groove member and which, in this case, is an included angle of approximately 37 degrees.

The forming roller 11 is provided with radially facing annular shoulders 62, 63 on opposite sides of the ridge portion 60 and which annular bead forming grooves 64, 65 recessed into these shoulders and merging smoothly with the side faces 60a, 60b of the ridge portion adjacent the base of the latter. The roller 11 is made of a suitable material, such as hardened tool steel.

In the performance of the splitting procedure of this invention, the blank 13 is clamped in the workholder means 14 in the relation shown in FIG. 1 and described above, and the splitting roller 10 is advanced toward the peripheral edge face 23 of the blank with the sharp annular edge 57 of the roller lying in or centered on the mid-plane of the blank. The feeding movement of the roller 10 toward the blank 13 is carried out with an initial rapid approach movement and brings the splitting edge 57 to a position at or about a distance comprising a fraction of an inch, say, approximately one-eighth of an inch, from the edge face 23 of the blank.

The rapid approach feeding movement of the splitting roller 10 can be at any suitable fast rate, but the movement of the tool to advance the splitting edge 57 into a touch engagement or marking contact with the edge face 23 of the blank should be at a relatively slow rate of feed. The rate of feed for this touch engagement can be reasonably varied and will depend to an appreciable extent upon the dimensions and characteristics of the blank 13 and of the splitting tool 10. For some blank materials and dimensions, touch feed movements of from three to ten inches per minute are appropriate and have been used in the method hereof. Such an appropriate slow touch feed movement of the splitting edge 57 into engagement with the blank 13 will cause the edge face 23 of the blank to be marked therearound on the mid-plane with little or no run-off tendency of the tool and with little or no likelihood of the blank being torn or deflected.

As soon as the splitting edge 57 has been brought into such a marking engagement with the edge face 23 of the blank 13 by the slow touch feed movement just described above, the splitting roller can then be advanced at a more rapid feeding rate for penetrating the tool into the edge portion of the blank to split the same. The feeding rate for the roller 10 during this splitting penetration can be at a rate considerably faster than the touch feed movement. Again, the penetrating feed movement can be reasonably varied and will depend to an appreciable extent upon the dimensions and characteristics of the blank and splitting tool, as well as on the value of the pressure being applied. For certain blanks a penetrating feed of approximately 35 inches per minute has been found satisfactory. The pressure for causing the roller 10 to penetrate the blank is applied through the shaft or arbor 54 thereof and is of a value suitable for the blank and for the rate of penetration desired.

During the splitting and forming operations performed on the blank 13, the workholder means 14 is driven and rotates the blank at a suitable speed which can be varied depending upon the size of the blank, characteristics of the metal thereof, the characteristics of the tools 10 and 11, and various other factors. The blank preferably is rotated at between 700–1100 r.p.m.'s and 900 r.p.m.'s have been found to produce good quality pulleys. The splitting roller 10 can be rotatably driven by appropriate power means, provided that it is not rotated at a faster speed than the blank 13. In the machine disclosed in said original application, however, the splitting roller 10 is rotated merely as the result of its engagement with the rotatably driven blank 13.

The relatively slow touch feed movement for the splitting roller 10 is needed when this roller is not separately driven because, in addition to the start of the penetration of the splitting edge 57 into the blank 13, the splitting roller must be accelerated during the touch engagement from a zero speed to the rotative speed at which the blank is being driven by the workholder means 14. This acceleration of the splitting tool 10 represents a drag applied thereby to the annular edge portion of the blank and, if the drag effect is too severe, there is a possibility that tearing or other damage may be inflicted on the blank. The sequence described above for the different speeds of feeding movement is not essential and any desired rates and sequence of feeding movement can be employed, so long as they provide for a slow-feed touch engagement of the splitting roller with the edge portion of the blank which will permit acceleration of the splitting roller without damaging the blank.

Figure 2:
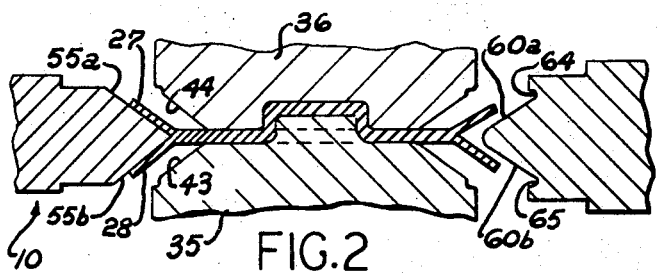

The penetration of the edge portion 57 of the roller 10 into the blank 13 splits the portion 22 of the latter peripherally therearound and separates such edge portion into the two spaced or divergent flanges 27, 28 as the roller moves inwardly as shown in FIG. 2. As the roller 10 splits the blank and moves inwardly thereof, the surfaces 55a, 55b of the roller spread the flanges while the blank is being split. Moreover, the flanges are formed of equal thickness and are straight throughout the length thereof. When the splitting roller 10 has been advanced toward the workholder means 14 for a feeding distance sufficient to cause the edge portion 56 to penetrate and split the blank for the desired depth, the flanges 27, 28 will be opened or spread by deflection thereof toward the bevel faces 43, 44 of the workholder members 35, 36 and will, in the form of the invention disclosed in the drawings, be pressed laterally against these faces by the action of the inclined side walls 55a, 55b of the ridge portion 56.

Figure 3:
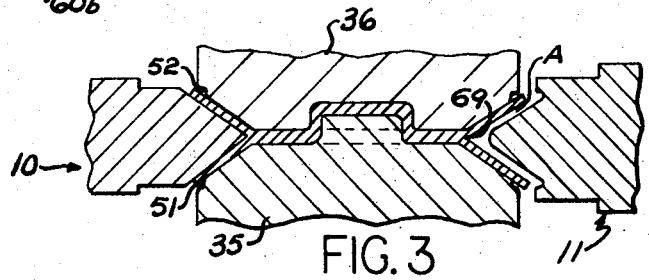

The splitting of the edge portion 22 of the blank 13 and the spreading apart or opening of the flanges 27, 28 results in the formation of an annular groove A which will have an included angle of preferably approximately the 37 degree included angle referred to above, but the bottom portion 69 of this groove will still have a sharp V-shape, as shown in FIG. 3, and corresponding with the sharp V-shape of the annular splitting portion 56 of the roller 10. At the completion of the splitting step performed by the roller 10, the outer or free annular edges of the divergent flanges 27, 28 will project beyond the inner edges of the annular notches 51, 52 of the workholder members 35, 36 as shown in FIG. 3.

While the splitting roller 10 is fed inwardly, the forming roller is also fed inwardly of the blank. Thus, these tools move inwardly of the blank simultaneously. The forming roller 11, however, lags behind the splitting roller 10 and thus the splitting tool splits the blank, as shown in FIG. 3, while the forming tool is spaced slightly therefrom. The forming roller 11 is then advanced into operative engagement with such split portion which results in a shaping or reshaping of the split portion to the condition illustrated in FIG. 5 and corresponding with the shape desired for the rim portion of the completed wheel. The forming roller 11 engages the blank while the splitting roller 10 is at or near its innermost position relative to the blank.

Figure 4:
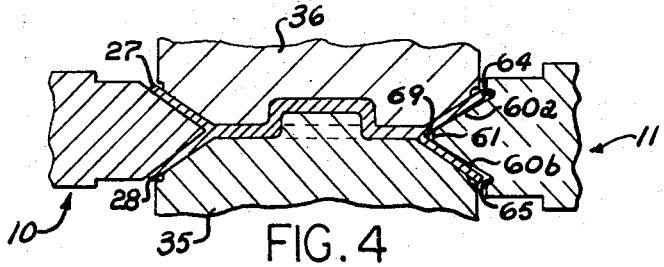

The forming roller 11 moves into engagement with the blank 13, while the splitting roller 10 remains in the groove A, as shown in FIG. 4. Thus, both rollers 10, 11 are located in groove A at the same time and both rollers engage the blank at the same time. The splitting roller 10, as shown in FIG. 4, has moved sufficiently to produce the desired depth groove in the blank. The roller 10 maintains its engagement with the blank and the forming roller 11, as shown in FIG. 4, has moved to a position where the blunt edge portion 61 engages the bottom of the groove. Further inward movement of the roller 11 effects the rounding of the bottom of the groove and brings the side faces 60a, 60b of the ridge portion into a smoothing and flattening engagement with the divergent flanges 27, 28. More important, however, is the cooperative engagement of the blunt edge 61 of the forming roller with and in the sharp V-bottom portion of the groove A which causes a widening and reshaping of this bottom portion into the transversely concave smoothly filleted annular bottom portion shown in FIGS. 5 and 6, and which is the desired finished shape and contour for the bottom of this groove in the completed wheel. This action converts the straight lines of the bottom split groove to radius lines.

The forming pressure is applied to the blank by the roller 11 in order to round off and shape the bottom of the groove, as noted hereinabove, while the splitting roller 10 maintains its innermost position relative to the blank. Thus, not only are both the splitting and forming rollers located in the groove at the same time, but also the splitting and forming rollers engage the blank at the base of the groove at substantially the same time. The forming or rounding of the bottom of the groove may have a tendency to thicken the flanges somewhat.

In accordance with the present invention, the splitting and forming rollers 10, 11 are located at diametrically opposite sides of the blank and engage the blank at diametrically opposite locations. Since the rollers 10, 11 simultaneously engage the blank at opposite locations, the force applied by the roller 11 to the blank is counteracted by the force holding the roller 10 in position. These forces counteract each other and tend to minimize lateral deflection of the blank and work-holder 14 and the supports thereof and undue wear on the bearings supporting the workholder for rotation.

The advance feeding movement of the forming roller 11 is preferably carried out with a rapid approach feed and is then advanced into engagement with the split portion with a slower feeding rate to accomplish the forming operation of the blank. For the purpose of the forming operation by the roller 11, the split blank 13 is rotated by the workholder means 14. The roller 11 can, if desired, be individually driven, but, in the machine of which the workholder 14 usually forms a part, it is driven only by its engagement with the blank 13.

The feeding movement of the forming roller 11 also brings the bead-forming grooves 64, 65 thereof into deflecting engagement with the free annular edges of the divergent flanges 27, 28 to form those edge portions into the smooth annular beads C and D on the rim of the completed wheel 25.

The engagement of the forming roller 11 with the blank as described above, is carried out by the use of a pressure of a suitable value applied to the forming roller through the support shaft or arbor 54a thereof to accomplish the forming or shaping of the split portion of the blank to the desired final wheel-rim form.

Figure 5:
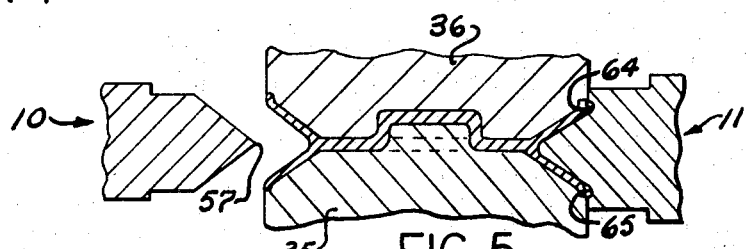
Figure 6:
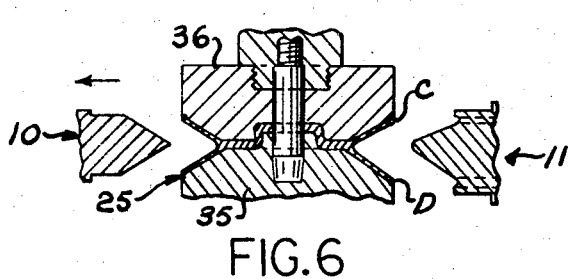

The splitting roller 10, after the forming roller 11 has applied its initial pressure to the bottom of the groove, is withdrawn from the groove and the forming roller 11 is then likewise withdrawn. The splitting roller 10 may be withdrawn prior to any withdrawing movement of the forming roller 11 and while the forming roller 11 continues to shape the bottom of the groove as shown in FIG. 5.

It should be apparent from the above that applicant has developed a new and improved method and apparatus for forming grooved wheels, such as pulleys and the like, and that certain modifications, changes, and adaptations may be made therein by those skilled in the art to which it relates, and it is hereby intended to cover all such changes, modifications, and adaptations which come within the scope of the appended claims.

Having described my invention, I claim:

1. A method of forming a grooved member comprising the steps of providing a disc-shaped metal blank, rotating the blank about a predetermined axis, engaging an edge portion of the blank with the sharp edge of a splitting tool and then moving the splitting tool toward the axis of rotation of the blank to split the blank into a pair of flanges, spreading the flanges while effecting the splitting of the blank to form a groove of a desired configuration, moving a groove forming tool toward the axis of rotation of the blank and into the groove formed by the splitting tool, forcefully engaging the blank with the groove forming tool to effect a groove shaping operation, and counteracting the force applied to the blank by operation of the groove forming tool by engaging the blank with and maintaining the splitting tool in engagement with the blank during at least the initial part of the shaping performed by the forming tool.

2. The method of forming a grooved member as defined in claim 1 wherein said forming and splitting tools are moved into engagement with the blank from diametrically opposite locations and wherein the forming and splitting tools engage the blank at locations approximately 180 degrees apart.

3. The method of forming a grooved member as defined in claim 1 wherein said forming tool is moved into the groove to reshape said groove and including the step of rounding the bottom of the groove by the operation of the forming tool and wherein said forming tool and said splitting tool each engage the blank near the bottom of the groove simultaneously and at diametrically opposite locations.

4. The method of forming a grooved member as defined in claim 1 wherein the forming of said flanges by the splitting tool includes the forming of straight flanges throughout the length thereof providing a V-shaped groove in the blank.

5. An apparatus for forming a grooved member from a disc-like metal blank comprising spindle means for rotating the metal blank about a predetermined axis, a splitting tool having a sharp edge portion engageable with the blank and movable initially into engagement with an edge portion of the blank and then toward the axis of rotation of the blank to split the blank into a pair of flanges and spread the flanges to form a groove in the blank of a desired configuration, a groove forming tool, means for moving the groove forming tool toward the axis of rotation of the blank and into the groove formed by the splitting tool and to forcefully engage the groove forming tool with the blank to shape the groove formed by the splitting tool, and means for counteracting the force applied to the blank and spindle means by said groove forming tool including means for moving the splitting tool to split the blank into a pair of flanges and for maintaining said splitting tool in position engaging said blank while the groove forming tool forms the blank.

6. An apparatus as defined in claim 5 wherein said forming tool includes a rounded peripheral edge portion which moves into the groove formed by said splitting tool and effects a rounding of the bottom of the groove.

7. An apparatus as defined in claim 5 wherein said splitting tool has a tapered edge portion terminating in a cutting edge and is operable to form straight flanges throughout the length thereof with the angle formed by the flanges being equal to the angle of the taper of said edge portion of said cutting tool.

8. An apparatus for forming a grooved member from a metal blank comprising means for rotating the metal blank about a predetermined axis, the splitting tool having a sharp edge portion engageable with the blank for splitting the blank into a pair of flanges, means for moving the splitting tool into engagement with an edge portion of the blank to initially engage the blank and to continue movement of the splitting tool toward the axis of rotation of the blank to split the blank into a pair of flanges and spread the flanges to form a groove in the blank of a desired configuration, a forming tool, means for moving the forming tool toward the axis of rotation of the blank to reshape the groove formed by the spreading tool while the splitting tool engages the blank, said forming tool having bead forming grooves therein for engaging the free annular edges of said straight flanges and for deflecting said edges and forming said edges into smooth annular beads, and means supporting said splitting and forming tools at diametrically opposite locations for movement into engagement with the blank at diametrically opposite locations.

9. An apparatus as defined in claim 5 further including means supporting said splitting and forming tools at diametrically opposite locations relative to the blank for movement into engagement with the blank at diametrically opposite locations.

References Cited

UNITED STATES PATENTS

| | | | |
|---|---|---|---|
| 521,787 | 6/1894 | Fisher | 29—168 |
| 1,494,409 | 5/1924 | Bidle | 29—159 |
| 1,494,410 | 5/1924 | Bidle | 29—159 |
| 1,555,771 | 9/1925 | Stenz | 29—159 |
| 3,080,644 | 3/1963 | Previte et al. | 29—159 |
| 3,087,531 | 4/1963 | Pacak | 72—83 |
| 3,225,425 | 12/1965 | Skinnen et al. | 29—159 |

JOHN F. CAMPBELL, Primary Examiner

D. C. REILEY, Assistant Examiner

U.S. Cl. X.R.

29—64, 168; 72—83, 84; 77—32.8; 82—101